May 23, 1939.  J. MORKOSKI  2,159,669
GROUND-WORKING IMPLEMENT
Filed July 3, 1937  2 Sheets—Sheet 2
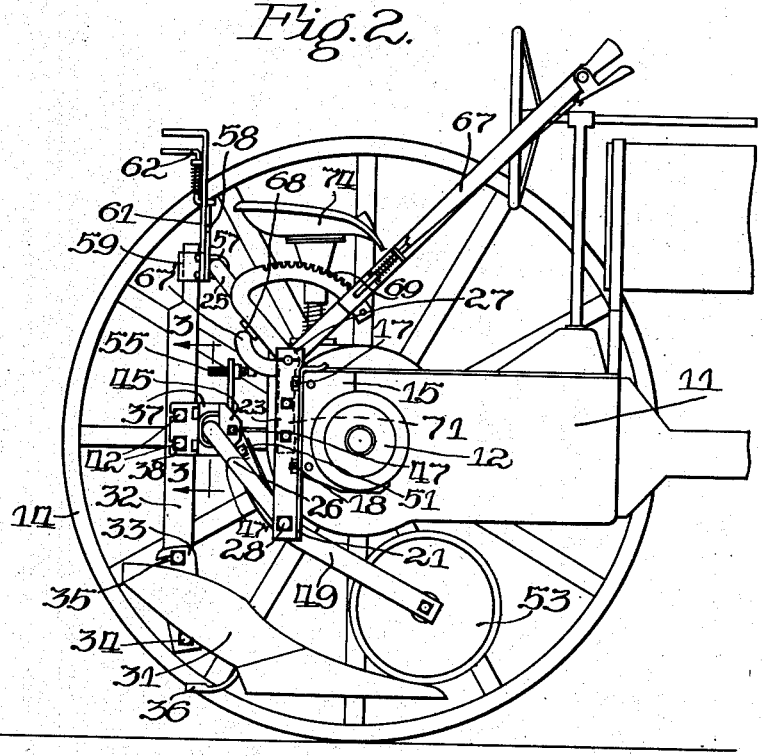
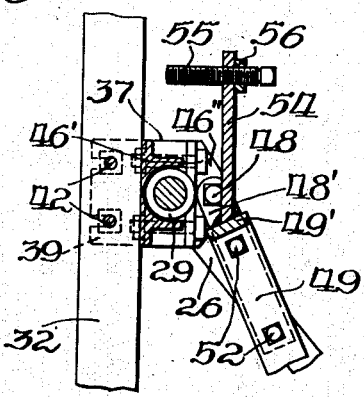
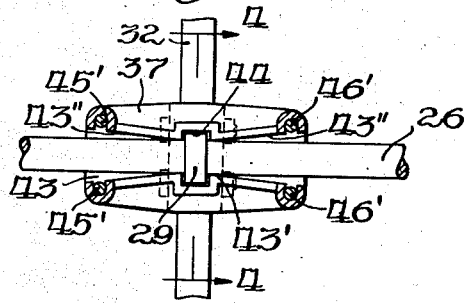
Inventor
James Morkoski
By [signature]
Att'y.

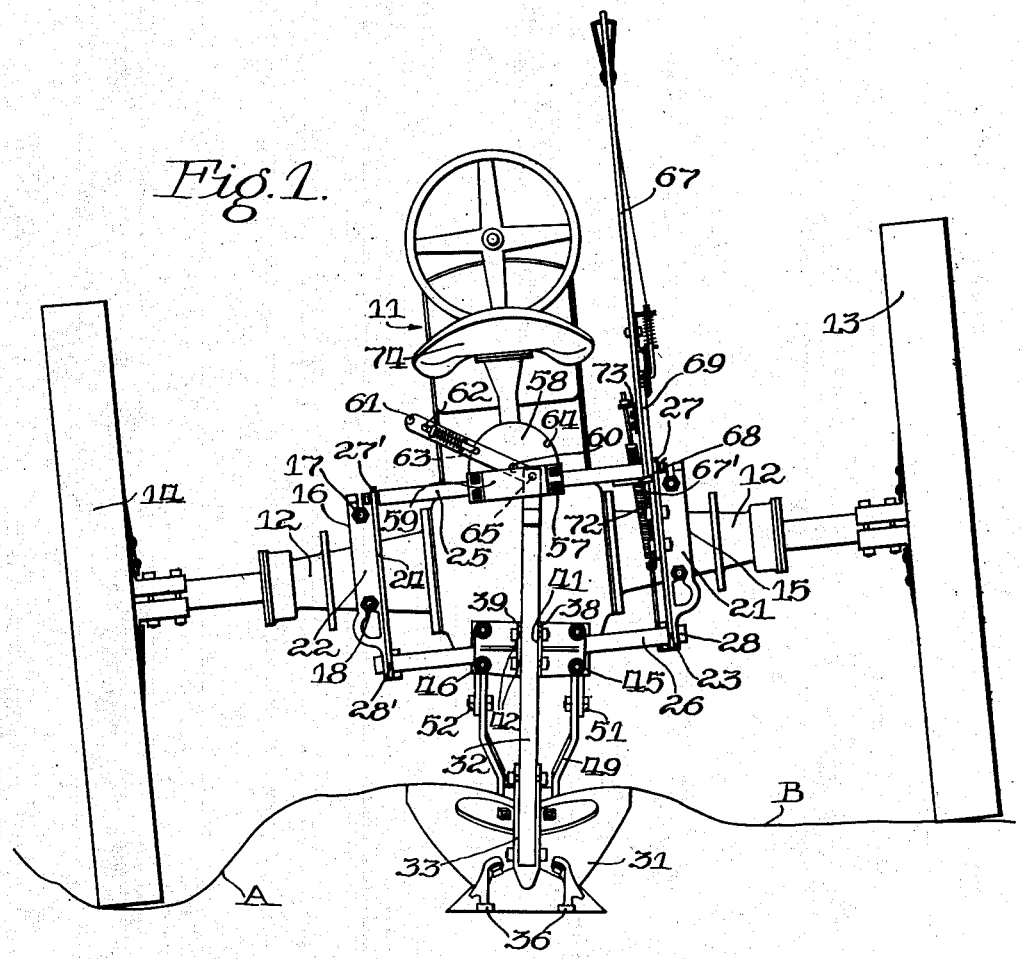

Patented May 23, 1939

2,159,669

UNITED STATES PATENT OFFICE 2,159,669

GROUND-WORKING IMPLEMENT

James Morkoski, Canton, Ill., assignor to International Harvester Company, a corporation of New Jersey Application July 3, 1937, Serial No. 151,814

12 Claims. (Cl. 97—47)

This invention relates to ground working implements and more particularly to implements of the type adapted to be quickly attached to a tractor.

In the working of ground with implements directly connected to the tractor, particularly in the initial plowing of the ground, one of the tractor wheels necessarily has to follow in one of the opened furrows, while the other wheel is on the higher unplowed ground. This causes the tractor to be tilted to one side, leaving the implement to follow untrue and out of vertical alignment with the ground.

It is, therefore, the principal object of this invention to provide in a directly connected type of implement means for laterally tilting the implement with respect to its frame and to the tractor, at the will of the operator, wherein a vertical alignment of the implement can be readily attained upon running the tractor with one wheel in a furrow.

It is another object of this invention to provide this tilting adjustment in an implement of the parallel lift type.

It is another object of the invention to provide a novel arrangement for mounting the coulter, in which the coulter is independently mounted for movement relative to the implement, but wherein vertical adjustment of the implement automatically adjusts the coulter.

Generally, the invention comprises a frame structure adapted to be quickly attached to a tractor and to which are pivotally mounted two parallel implement supporting elements, one above the other, for giving to the attached implement a parallel motion when the implement is adjusted by a manual vertical adjusting means carried by the frame structure. The implement itself has a stub beam which, in turn, has a bracket adapted to be connected to the lower supporting element in such a manner as to permit transverse tilting movement with relation thereto, and the beam extending upwardly to the upper supporting element and connected thereto through a manual tilting adjusting lever, which is available to the operator for adjusting the implement, stub beam and tiltable bracket on the lower supporting element.

For other objects and for more specific explanation of the invention, reference may be had to the following detailed description taken with the accompanying drawings, in which:

Figure 1 shows a rear elevational view of a tractor with one of its wheels in a furrow and having the implement of the present invention connected thereto, the working tool thereof being tilted with respect to the tractor;

Figure 2 is a side elevational view of the tractor and of the implement with its working tool raised to the transport position on the tractor;

Figure 3 is an elevational view, partly in section, taken on the line 3—3 of Figure 2, illustrating in detail the bracket for connecting the tool stub beam to the lower parallel supporting element; and, Figure 4 is a side elevational view, partly in section, taken along the line 4—4 of Figure 3, showing the bracket and the connection of other elements thereto.

In general, there is shown a tractor 11 having a rear axle housing 12, right and left rear wheels 13 and 14, respectively, and the axle housing 12 having quick attachable brackets 15 and 16, each having an associated upper swing bolt 17 and a lower swing bolt 18, at each side of the tractor to which an implement may be quickly attached.

The implement structure of the present invention comprises a frame structure of two vertically extending right and left members 21 and 22 having means adapted to be quickly attached to the quick attachment means on the tractor and held fixed thereto by the swing bolts 17 and 18. These frame members are preferably made of angle shaped material to provide vertically and rearwardly extending portions 23 and 24 to which other parts of the implement may be connected. Connected between the lower and upper ends of these vertically extending frame members are upper and lower bails or U-shaped supporting elements 25 and 26 spaced one above the other. These upper and lower bail elements have leg portions connected, respectively, at 27 and at 28 on the portion 23 of the right frame member 21 and at 27' and 28' on the vertical portion 24 of the left frame member 22.

Each of the bail members has a transversely extending portion between the leg portions thereof. The lower supporting element 26 has integral with its transverse portion an enlarged portion 29 (Figure 3), the function of which will be described hereinafter.

For the carrying of a ground working tool or implement 31, which happens to be, in the present instance, a lister plow bottom, there is a stub beam 32 extending vertically. The working tool 31 has an adjustable mounting bracket 33, which, in turn, is pivotally connected to the lower end of the stub beam 32, as at 34, and pivotally adjustable forwardly thereabout by slot and bolt means, as indicated at 35. The working tool is provided with trailing feet 36 for balancing the plow in the furrow.

For attaching the stub beam 32 and plow 31 to the transverse portion of the lower yoke supporting member 26, there is provided a bracket element or means 37, which contains one of the principal features of the present invention. The bracket element has vertically and rearwardly extending flanges 38 and 39 for attaching the same to the implement stub beam 32. These flange members 38 and 39 provide between them a rearwardly extending slot 41, in which the stub beam is maintained by means of transverse bolts 42, the bracket 37 being rigidly secured thereby.

In the forward face of the bracket, there is provided a transverse trough or groove 43, which is narrower in an intermediate portion 43' than at its flared end portions 43'' (Figure 3). In this intermediate portion 43' there is provided a pocket 44 adapted to loosely receive the enlarged portion 29 of the transversely extending portion of the bail supporting member 26. By having the bracket so fashioned, the stub beam with the ground working implement and bracket can be tilted within the flared portion to the right or left on the transversely extended portion of the supporting element 26.

The transverse portion of the supporting element 26 is maintained in the bracket trough 43 by retaining plate elements 45 and 46 at each end of the trough and fixed to the bracket by means of through-bolts 45' and 46' of the respective plates 45 and 46, (see Figures 3 and 4). The plate elements 45 and 46 each has forwardly extending flanged portions 45'' and 46'', respectively, loosely connected to which, by pivot bolts 47 and 48, are pivot arm members 47' and 48', which, in turn, have fixed thereto the closed end of an inverted U-shaped member 49 by means of bolts 51 and 52, respectively, the member 49 having a transverse portion 49' and downwardly extending leg portions. Between the lower ends of the leg portions is a coulter wheel 53 adapted to be located forwardly of the plow bottom 31 when the plow bottom is lowered into the ground for the plowing operation.

As shown in Figure 2, the coulter wheel 53 is lifted by the plow bottom when the plow bottom is raised to transport position on the tractor. In other words, the coulter is picked up with the plow bottom and made to pivot on the flanged portions 45'' and 46'' on the bracket 37, upon raising the plow out of the ground,—the plow bottom actually carrying the coulter when the plow is in position of transport on the tractor.

Upon the upper end of the U-shaped member and weldingly secured to its transverse portion 49' is a vertically extending arm member 54 having at its upper end an adjusting screw 55 with a lock nut 56. When the plow is lowered and drawn into the ground, the coulter will swing free of the plow upon the adjusting screw, engaging the forward face of the stub beam 32. By adjustment of this screw, the depth of cutting of the coulter wheel may be regulated. It will also be seen that the coulter wheel, by being attached to the bracket, will be tilted therewith and thereby maintain its vertical alignment with the implement.

It should be seen that the supporting element 26 and the bracket element 37 provide two interconnected elements, one adapted to be attached to the implement and the other to the frame structure, which are so connected as to give a transverse tilt of one element with respect to the other and, at the same time, a vertical rotation of one in the other. The two elements thus constitute means for connecting the implement to the frame.

On the transverse portion of the upper supporting element 25, there is fixed by means of U-bolts 57 a quadrant 58 and the flanges of a U-shaped member 59, which is so shaped as to include the upper end of the stub beam 32, providing a slot in which the end of the member may move transversely. Pivoted on the rear face of the quadrant 58, as at 60, is an adjusting lever arm 61 having a latch member 62 adapted to engage notches 63 and 64 formed on the quadrant member 58. This provides means for adjusting the tilt of the beam 32 and its working tool 31 about the transverse portion of the supporting member 26, the adjusting arm having the upper end of the stub beam 32 pivoted as at 65. By moving the adjusting arm 61 over the quadrant from the notch 63 to the notch 64, the implement is tilted from one extreme to the other. If the left wheel 14 of the tractor is running in the furrow, as indicated in Figure 1 at A, the lever arm 61 will be moved to the notch 63, thereby straightening the plow bottom with respect to the ground level B. If the right wheel 13 is riding in the furrow on the return trip across the field, the lever 61 would be moved over to the notch 64.

For raising and lowering the implement with respect to the frame and on the tractor, there is provided an adjusting lever 67 which is pivoted to the pivot 27 of the flange 23 of the frame member 21 at the right side of the tractor and which has a portion 67', the end of which is adapted to engage a plate piece 68 on a leg portion of the upper supporting member 25 to lift the same. The connection 65 serves to transmit lift to the stub beam 32. The lower supporting element 26 will serve as guide to give parallel motion to the vertical movement of the implement. A quadrant 69, having a downwardly extending portion 71, is also secured to the vertical flange portion 23 and is adapted to cooperate with the adjusting lever 67. Movement of the adjusting lever 67 forward on its quadrant thereby raises the plow and coulter out of ground engaging position and fixes the same to be carried by the tractor, while rearward movement of the lever 67 lowers the plow and coulter. For assisting in the lifting of the plow bottom out of the ground, there is provided a spring 72 connected at the point 28 and to the lever 67 by means of a bracket 73 thereon. Both of the levers 67 and 61 are readily reached from the operator's station 74.

By the present invention it should now be seen that there has been provided a direct connected, parallel lift type of implement and an arrangement therewith for transversely tilting a plow bottom or other ground working tool with respect to the tractor; also, that there has been provided an arrangement for a coulter wheel whereby the same is simultaneously lifted and lowered upon raising and lowering of the working tool.

It shall be understood that various incidental changes may be made in the present construction, but that these changes shall be made without departing from the spirit and scope of the invention as defined in the appended claims.

What is claimed as new is:

1. In a ground working machine, a frame structure, an implement, means for connecting the implement to the frame structure comprising two interconnected elements, one element being attached to the implement and the other element being attached to the frame structure, the interconnecting elements being so fashioned as to permit limited transverse tilt with respect to each other in one direction and rotation with respect to each other in another direction, means for adjusting the tilt of the implement with respect to the frame structure and between the two elements, and means for vertically adjusting the implement in parallel relationship to the frame structure through relative rotation of the elements.

2. In a ground working machine, a frame structure, an implement, means for connecting the implement to the frame structure comprising two interconnected elements, one element being attached to the implement and the other element being attached to the frame structure, one of the elements having a transversely extended portion with an enlarged portion thereon, the other of the elements being so fashioned as to contain the extended and enlarged portion of the other element and to permit limited tilt transversely thereof and rotation with respect to each other in a vertical plane, the enlarged portion prohibiting lateral movement between the two elements, means for adjusting the tilt of the implement on the frame structure by relative tilt of the two elements, and means for vertically adjusting the implement in parallel relationship to the frame structure, the two elements permitting rotative movement between them.

3. In combination with a tractor having a quick attachable means, a ground working implement adapted to be quickly attached to the tractor attachable means and to be directly carried thereon and having parallel bails pivotally mounted one above the other, an implement carrying beam pivoted on the lower bail for tilting movement transversely of the tractor, manual means carried by the upper bail for adjusting the transverse tilt of the implement, and means for vertically adjusting the bails to raise and lower the implement.

4. In a ground working implement, a frame structure, a ground working tool mounted for vertical movement on the frame structure, a coulter wheel, means for separately mounting the coulter wheel for vertical movement in vertical alignment with the working tool and adapted to be in engagement therewith during a part of the vertical movement for the purpose of lifting the coulter wheel and retaining the same through a predetermined downward movement with respect to the frame structure, and means for simultaneously raising and lowering the working tool and coulter.

5. In a ground working machine, a frame structure, an implement, means for connecting the implement to the frame structure comprising two interconnected elements, one element being attached to the implement and the other element being attached to the frame structure, the interconnecting elements being so fashioned as to permit limited transverse tilt with respect to each other and rotation with respect to each other in another direction, means for adjusting the tilt of the implement with respect to the frame structure and between the two elements, and means for vertically adjusting the implement through relative rotation of the elements.

6. In a ground working machine, a frame structure, an implement, means for connecting the implement to the frame structure comprising two interconnected elements, one element being attached to the implement and the other element being attached to the frame structure, one of the elements having a transversely extended portion with an enlarged portion thereon, the other of the elements being so fashioned as to contain the extended and enlarged portion of the other element and to permit limited tilt transversely thereof and rotation with respect to each other in a vertical plane, the enlarged portion prohibiting lateral movement between the two elements, means for adjusting the tilt of the implement on the frame structure by relative tilt of the two elements, and means for vertically adjusting the implement through relative rotation of the elements.

7. In a ground working machine, a frame structure, parallel link members pivotally mounted one above the other on the frame structure, a tool carrying beam mounted on the lower member for tilting movement, a ground working tool connected to the carrying beam, means carried by the upper link member for adjusting the transverse tilt of the tool carrying beam, and means for adjusting the link members to raise and lower the carrying beam and working tool.

8. In a ground working implement, a frame structure, parallel link members pivotally mounted one above the other on the frame structure, a ground working tool, a vertical tool-carrying beam for the ground working tool, means for connecting the beam to the lower link member for tilting movement relative thereto, means for connecting the beam to the upper link member for tilting movement relative thereto, adjusting means for effecting tilting adjustment of the beam relative to the link members and frame structure, and means for vertically adjusting the link members to raise and lower the carrying beam and working tool.

9. In a ground working implement, a frame structure, a ground working tool mounted for vertical movement on the frame structure, a coulter wheel mounted for independent relative vertical movement with respect to the working tool and adapted to be engaged by the working tool for the purpose of lifting and lowering the coulter wheel, and means for simultaneously raising and lowering the working tool and coulter wheel.

10. In a ground working implement, a frame structure, means for mounting a ground working tool for vertical movement on the frame structure, a coulter wheel adjustably mounted on the mounting means and adapted to be engaged by the working tool for the purpose of being lifted and lowered, means for adjusting the relative cutting depth of the coulter wheel, and means for simultaneously raising and lowering the working tool and coulter.

11. In a ground working implement, a frame structure, a supporting member mounted for vertical movement on the frame structure, a bracket member connected to the supporting member and fashioned to have transverse tiltable movement thereon, a ground working tool connected to the bracket member for movement therewith, a coulter wheel connected to the bracket member for tilting movement therewith and for independent vertical movement with respect thereto but adapted to be engaged by the working tool for the purpose of being lifted and lowered by the same, means for tiltably adjusting the bracket member with respect to the supporting member, and means for adjustably raising and lowering the supporting and bracket members, whereby simultaneous adjustments of the working tool and coulter wheels may be respectively effected.

12. In combination, a tractor, two bails pivotally mounted on the tractor one above the other, an implement-carrying beam pivoted on the lower bail for tilting movement transversely of the tractor, manual means carried by the upper bail for adjusting the transverse tilt of the implement beam, and means for vertically adjusting the bails to raise and lower the implement-carrying beam.

JAMES MORKOSKI.